United States Patent [19]
Shimizu

[11] Patent Number: 5,844,729
[45] Date of Patent: Dec. 1, 1998

[54] WIDE ANGLE PHOTOGRAPHIC LENS

[75] Inventor: Yoshiyuki Shimizu, Kanagawa-ken, Japan

[73] Assignee: Nikon Corporation, Tokyo, Japan

[21] Appl. No.: 650,449

[22] Filed: May 20, 1996

[30] Foreign Application Priority Data

May 25, 1995 [JP] Japan ................................. 7-152652

[51] Int. Cl.$^6$ ........................................... G02B 9/34
[52] U.S. Cl. ................................................. 359/781
[58] Field of Search ................................ 359/753, 781,
359/748, 782, 783, 822, 823, 686, 684, 680

[56] References Cited

U.S. PATENT DOCUMENTS

| | | | |
|---|---|---|---|
| 2,826,115 | 3/1958 | Lange | 359/781 |
| 2,849,918 | 9/1958 | Eismann et al. | 359/781 |
| 3,549,241 | 10/1968 | Mori | 359/754 |
| 4,013,349 | 3/1977 | Bertele et al. | 350/214 |
| 4,033,675 | 7/1977 | Terasawa et al. | 350/216 |
| 4,206,973 | 6/1980 | Ikemori | 350/214 |
| 4,981,344 | 1/1991 | Ueda | 350/463 |
| 5,056,901 | 10/1991 | Rieche et al. | 359/737 |
| 5,315,441 | 5/1994 | Hori et al. | 359/753 |

FOREIGN PATENT DOCUMENTS

| | | | |
|---|---|---|---|
| 3-288110 | 12/1991 | Japan | 359/781 |
| 05-045581 | 9/1994 | Japan. | |

*Primary Examiner*—Frank G. Font
*Assistant Examiner*—Michael P. Stafira
*Attorney, Agent, or Firm*—Oliff & Berridge, PLC

[57] ABSTRACT

A small, light weight wide angle photographic lens has attachment size of less than approximately 3.5 times the focal length and has a field angle of approximately 100°.

The wide angle photographic lens includes a first lens $L_1$ having a negative refractive power and a concave surface facing the image side; a second lens $L_2$ with a positive refractive power having the convex surface facing the object side; a third lens $L_3$ having a negative refractive power cemented to the second lens $L_2$ and having a surface with a larger absolute value of index of refraction on the image side; a fourth lens $L_4$ having a positive refractive power cemented to the third lens $L_3$ and having a surface with a larger index of refraction on the object side; and a plurality of lenses on the image side of the fourth lens $L_4$, wherein the concave surface of the first lens $L_1$ is an aspherical surface with a conical constant κ greater than 0.3 and less than 0.3 with a curvature of the concave surface decreasing monotonically with increasing distance from the optical axis. The wide angle photographic lens also satisfies conditions $0<n_4-n_3<0.15$ and $0.2<r_5/f<0.7$ where $n_3$ and $n_4$ denote the index of refraction of the third lens $L_3$ and the fourth lens $L_4$, respectively, $r_5$ denotes the radius of curvature of the boundary surface between both lenses $L_3$ and $L_4$, and f denotes the focal length of the total lens system.

9 Claims, 5 Drawing Sheets

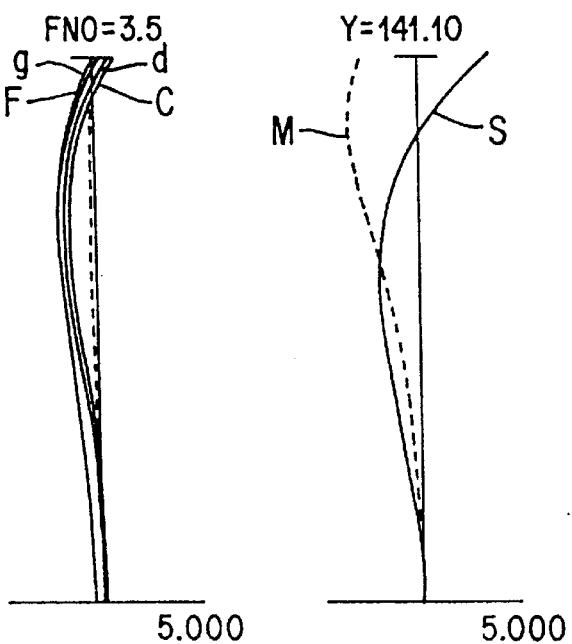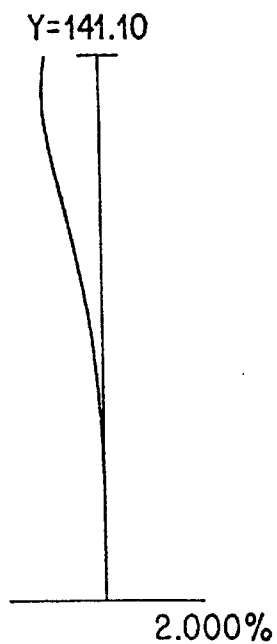
FIG.2A  FIG.2B  FIG.2C
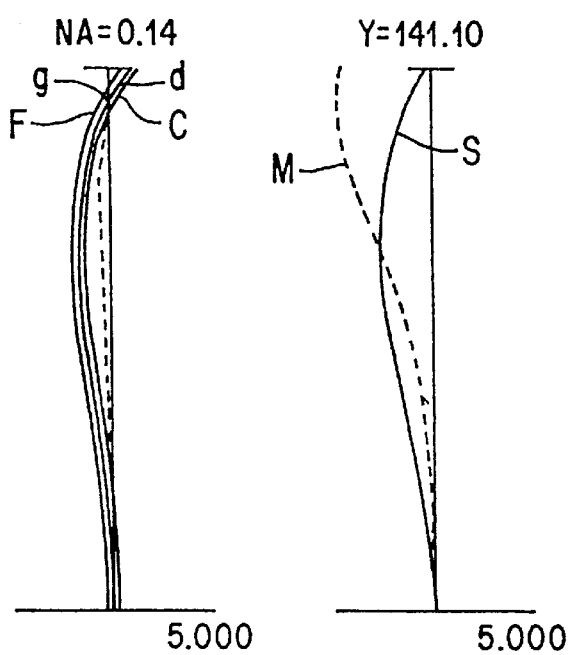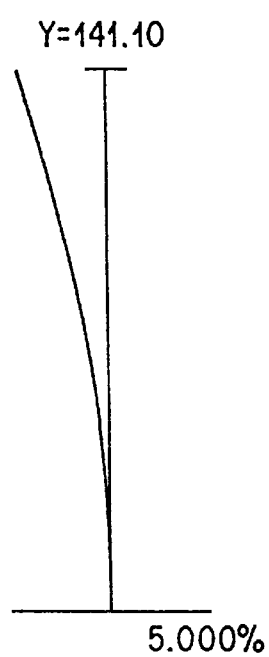
FIG.2D  FIG.2E  FIG.2F

WIDE ANGLE PHOTOGRAPHIC LENS

FIELD OF THE INVENTION

The invention relates to a photographic wide angle lens of a small, light weight camera with very long back focus, which may also be used as a single-lens reflex camera with a revolving mirror.

BACKGROUND OF THE INVENTION

Examples of wide angle photographic lenses for single-lens reflex camera are disclosed in Japanese Laid-Open Patent Publication No. 5-45581. However, all of these lenses have a large volume, and there are few lenses having a field angle of about 100° with an attachment size smaller than four times that of the focal length. With regard to lenses having field angles equal to or larger than 110°, the attachment size is in the range of 4.5 to 5 times the focal length.

SUMMARY OF THE INVENTION

With the conventional wide angle photographic lenses described above, the attachment size becomes very large when the field angle is sufficiently wide. Conversely, the field angle is not necessarily very wide when the attachment size is small.

Hence, it is an object of the invention to provide a small, light weight camera whose field angle is larger than about 100°, with an attachment size of no more than 3.5 times the focal length by keeping the aperture diameter of the first lens small and by keeping the curvature of the first surface of the object side surface of the first lens small.

In order to achieve the above-stated object, the wide angle photographic lens of the present invention comprises, in order from an object side: a first lens $L_1$ having a negative refractive power and having a meniscus shape with a concave surface facing the image side; a second lens $L_2$ having a positive refractive power and having a convex surface facing the object side; a third lens $L_3$ having a negative refractive power, being cemented to the second lens $L_2$ and having a surface with a larger absolute value of the refractive power on the image side; a fourth lens $L_4$ having a positive refractive power and having a surface with a larger refractive power on the object side; and a plurality of lenses and an iris diaphragm on the image side of the fourth lens $L_4$. The shape of the image side concave surface of the first lens $L_1$ satisfies the following conditional formula, in which x is a distance in a direction of an optical axis of the lens, y is a height from the optical axis, c is a curvature of a concave surface at a vertex, $\kappa$ is a conical constant and $c_4, c_8 \ldots$, are constants.

$$x = cy^2 / \{1 + (1 - \kappa c^2 y^2)^{1/2}\} + c_4 y^4 + c_6 y^6 + \quad (a)$$

Additionally:

$$-0.3 < \kappa < 0.3 \quad (1)$$

where the curvature of the concave surface decreases monotonically with increasing distance from the optical axis. The wide-angle photographic lens further satisfies the following conditional formulae:

$$0 < n_4 - n_3 < 0.15 \quad (2)$$

$$0.2 < r_5 / f < 0.7 \quad (3)$$

where $n_3$ and $n_4$ are the index of refraction of the third lens $L_3$ and the fourth lens $L_4$, respectively, $r_5$ is a radius of curvature of a common boundary surface of the third lens $L_3$ and the fourth lens $L_4$, and f is a focal length of the total lens system.

According to the invention, the wide angle photographic lens preferably satisfies the following conditional formula:

$$0.15 < n_i - n_r \quad (4)$$

where, $n_i$ is an average value of the index of refraction of all negative lenses that are positioned on the image side of the iris diaphragm and $n_r$ is the average value of the index of refraction of all positive lenses that are positioned on the image side of the iris diaphragm out of the plurality of the lenses arranged on the image side of the fourth lens $L_4$.

BRIEF DESCRIPTION OF THE DRAWINGS

FIGS. 2A–2C and 2D–2F are graphs that show spherical aberration, astigmatism and distortion, respectively, at infinite shooting state and at about $\frac{1}{15}$ magnification shooting state in accordance with the first embodiment;

DESCRIPTION OF THE PREFERRED EMBODIMENTS

Figure 1:
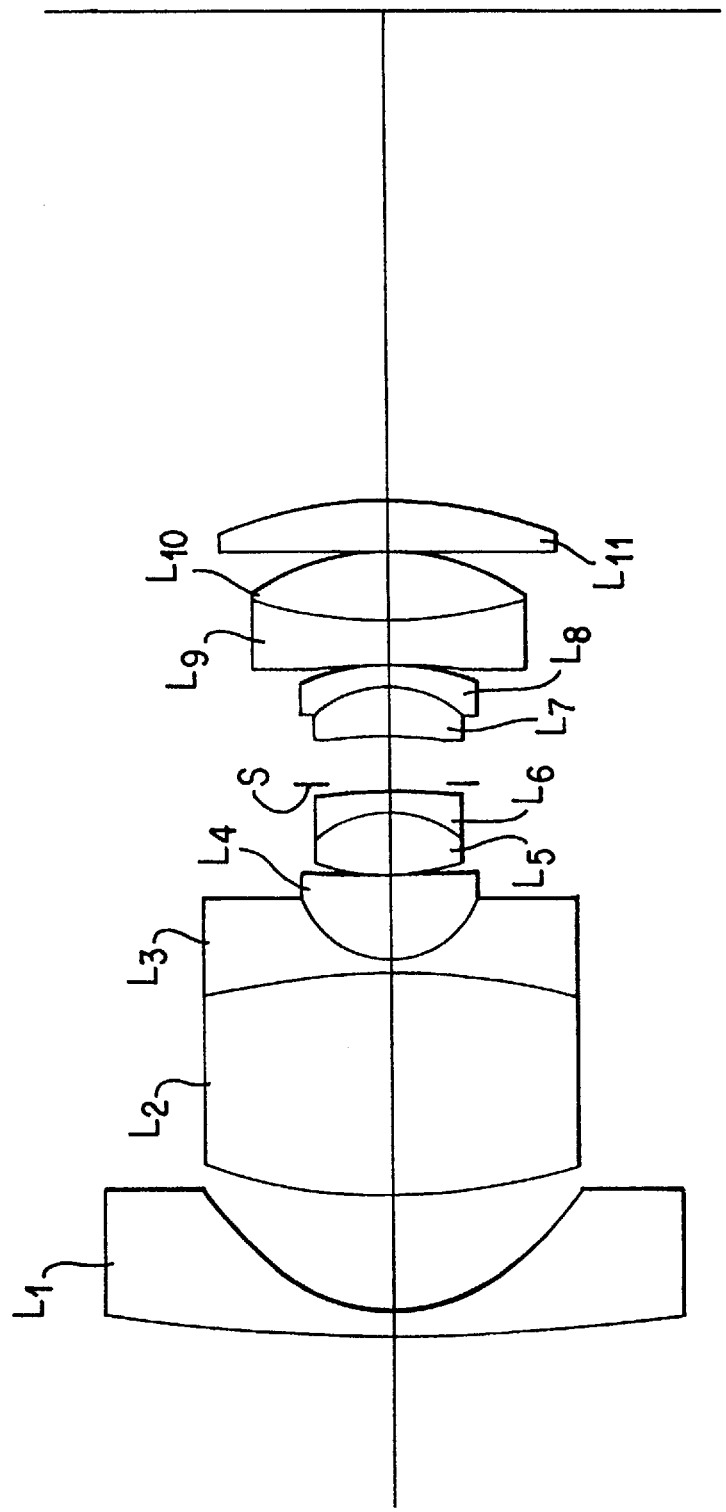
FIG. 1 is a schematic side view of the structure of the lens of the first embodiment of the invention.
Figure 3A:
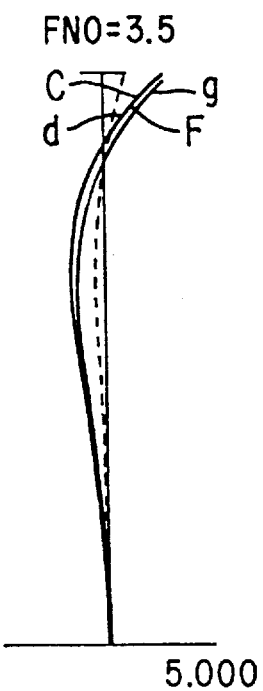
FIGS. 3A–3C and 3D–3F are graphs that show spherical aberration, astigmatism and distortion, respectively, at infinite shooting state and at about $\frac{1}{15}$ magnification shooting state in accordance with a second embodiment.
Figure 3B:
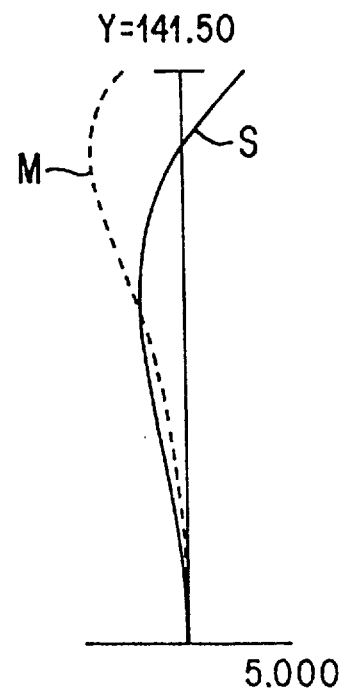
Figure 3C:
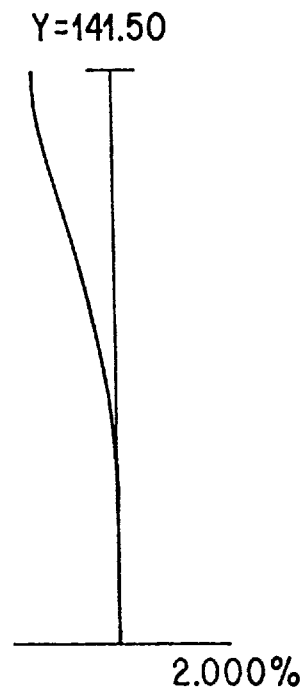
Figure 3D:
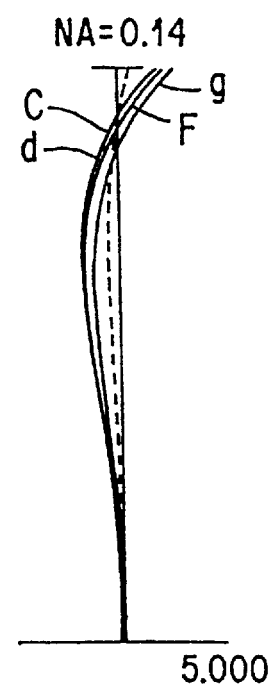
Figure 3E:
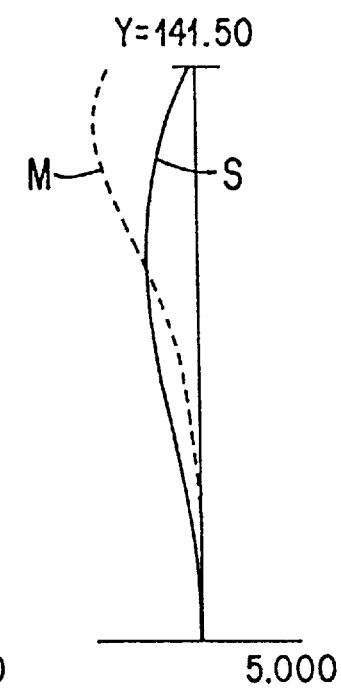
Figure 3F:
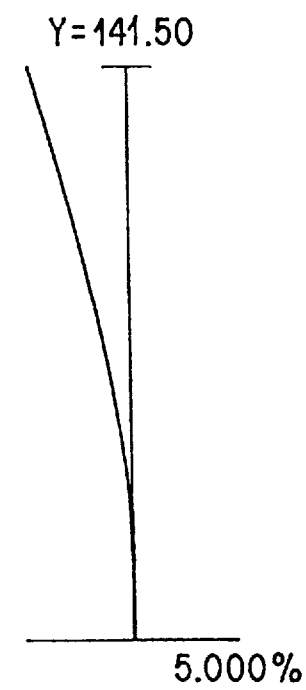

In a wide angle lens, typically, a front lens group having a negative refractive power is arranged on the object side, a rear lens group having a positive refractive power is arranged on the image side of the lens system, and an iris diaphragm is normally positioned in the rear group. With the above structure, the back focus is longer than the focal length, the Petzval sum is negative, and negative distortion and internal coma occur. These are mostly due to the effect of the front group having the negative refractive power. Thus, the larger the refractive power of the front group, the more noticeable such characteristics become. Provided that the refractive power of the front group is not too large and the back focus and the field angle are relatively small, these characteristics may function as an advantage in designing the lens. However, if the field angle exceeds 100°, and a back focus of more than twice the focal length is required, the relative refractive power of the front group becomes large, causing astigmatism of the image plane in the positive direction and large negative distortion, making the above-stated tendencies undesirable in designing the lens.

In view of the above mentioned problems, astigmatism of the image plane in the positive direction may be resolved by making the distance between the front and rear lens groups larger. When the distance between the front and the rear lens groups is increased while maintaining the ratio of the back focus to the focal length constant, the negative refractive power of the front lens group becomes smaller, but the change in the positive refractive power of the rear group is relatively small and the characteristics of the rear group having relative positive refractive power are emphasized. Hence, the characteristics and coma of the image plane of the total lens system are similar to the case in which only the rear group is present, provided that the distance between both groups is sufficiently large, and a wide angle photographic lens may be achieved by the simple application of the prior art. Further, although astigmatism in the image plane may be corrected by making the distance between the front and rear lens groups large, the effective diameter necessary for the front lens group in this case becomes large, making it impossible to achieve a small, light weight wide angle photographic lens. This results because the iris diaphragm is contained in the rear lens group and making the distance between the front and rear lens groups large does not result in much change in the relative position of the entrance pupil and the rear lens groups in the total lens system, causing the distance between the front lens group and the entrance pupil to change according to the distance between the front and rear lens groups. This is the reason that the attachment size of the wide angle photographic lens tends to become large.

On the other hand, distortion is expressed in terms of the ratio of the heights of the ideal image and the actually formed image. A negative distortion may not directly be corrected by making the distance between the front and rear lens groups large and by making the effective diameter of the front lens group large, that is, by the above-mentioned means for correcting the astigmatism in the image plane. This is because, as the effective diameter of the front lens group becomes large, the position of the entrance pupil retreats, and the height at which the main light rays pass through the front group does not change much relatively. Thus, the value of the distortion that occurs does not change much. However, as a result of reducing the burden related to correction of astigmatism in the image plane and coma, correction of distortion becomes easier and the fact that the lens volume is large has an indirect advantage on the correction of distortion.

This concludes an explanation on the general structure of a wide angle photographic lens and tendencies for aberrations to occur. However, according to the invention, the first lens $L_1$ has a negative meniscus lens with the concave surface facing the image side and the image side concave surface $r_2$ is an aspherical surface close to the parabolic surface in order to correct the negative distortion. The reason for such a shape is that an aspherical surface like a rotational parabolic surface has less of an occurrence of distortion and internal coma than a spherical surface. The reason for having a concave surface facing the image side is to control the occurrence of negative distortion by making the main light rays pass through the first lens $L_1$ with nearly the minimum polarization angle.

If the conical constant κ of the aspherical surface $r_2$ is −0.3 or less, the characteristics of the hyperbolic surface becomes strong and the difference between refractive powers near the optical axis and in the vicinity of the periphery of the lens becomes too large, causing extreme tilt of the image plane towards the negative. If κ is larger than 0.3, the characteristics close to the spherical surface dominate and distortion cannot be corrected satisfactorily. Hence the range of the conical constant κ is set by conditional formula (1). Further, though constants $c_4, c_6, \ldots$, of the correction terms of degree 4 and higher in conditional formula (a) are not necessarily equal to 0, the curvature of the aspherical surface $r_2$ is made to decrease monotonically with the increasing distance from the optical axis in order to prevent the occurrence of negative distortion and internal coma. An even better result may be obtained by changing the lower limit value and the upper limit value of the conditional formula (1) to −0.2 and 0.2, respectively.

Also, in the invention, the second, the third and the fourth lenses $L_2$, $L_3$, and $L_4$ are cemented to one another and satisfy conditional formulas (2) and (3). By satisfying both formulas, the boundary surface between the third lens $L_3$ and the fourth lens $L_4$ has a smaller positive refractive power relative to the radius of curvature $r_5$. Such a surface may cause the occurrence of a negative spherical aberration of a high order, in particular, it may correct the spherical aberration of a marginal ray to the negative direction, resulting in favorable spherical aberration and coma conditions.

If $n_4-n_3$ is smaller than the lower limit value of conditional formula (2), the spherical aberration becomes undesirably large in a positive sense. If $n_4-n_3$ is larger than the upper limit value of conditional formula (2), the correction condition of spherical aberration becomes poor and becomes disadvantageous from the Petzval sum point of view. If $r_5/f$ is smaller than the lower limit value of conditional formula (3), the radius of curvature of the lens becomes too small and design and manufacturing become impossible. If $r_5/f$ is larger than the upper limit value, the capability of correcting higher degree aberrations decreases, which is not desirable. An even better result is obtained if the upper limit value in conditional formula (2) is changed to 0.12. Likewise, a better result is obtained if the lower limit value and the upper limit value in conditional formula (3) are changed to 0.3 and 0.6, respectively.

In order to maintain the image plane of the total lens system in favorable condition, conditional formula (4) may be preferably satisfied. Conditional formula (4) is used to make the Petzval sum positive. In general, the Petzval sum is expressed as the sum of 1/nf for each lens, n being the index of refraction and f being the focal length. If n is small, 1/nf becomes large, and if n is large, 1/nf becomes small. By making the index of refraction of the positive lens relatively small and making the index of refraction of the negative lens larger out of all the lenses arranged closer to the image side than the iris diaphragm, a large, positive Petzval sum may be obtained. Further, it is desirable to make the absolute value of the index of refraction of each lens larger. If $n_f-n_r$ is smaller than the lower limit value of the conditional formula (4), the Petzval sum becomes undesirably large in a negative sense, which causes either astigmatism in the image plane in the positive direction or the radius of curvature of each lens becomes too small to make the Petzval sum positively larger. Hence, large spherical aberration or coma occurs. An even better result is obtained if the lower limit value is changed to 0.2 in conditional formula (4).

Figure 4:
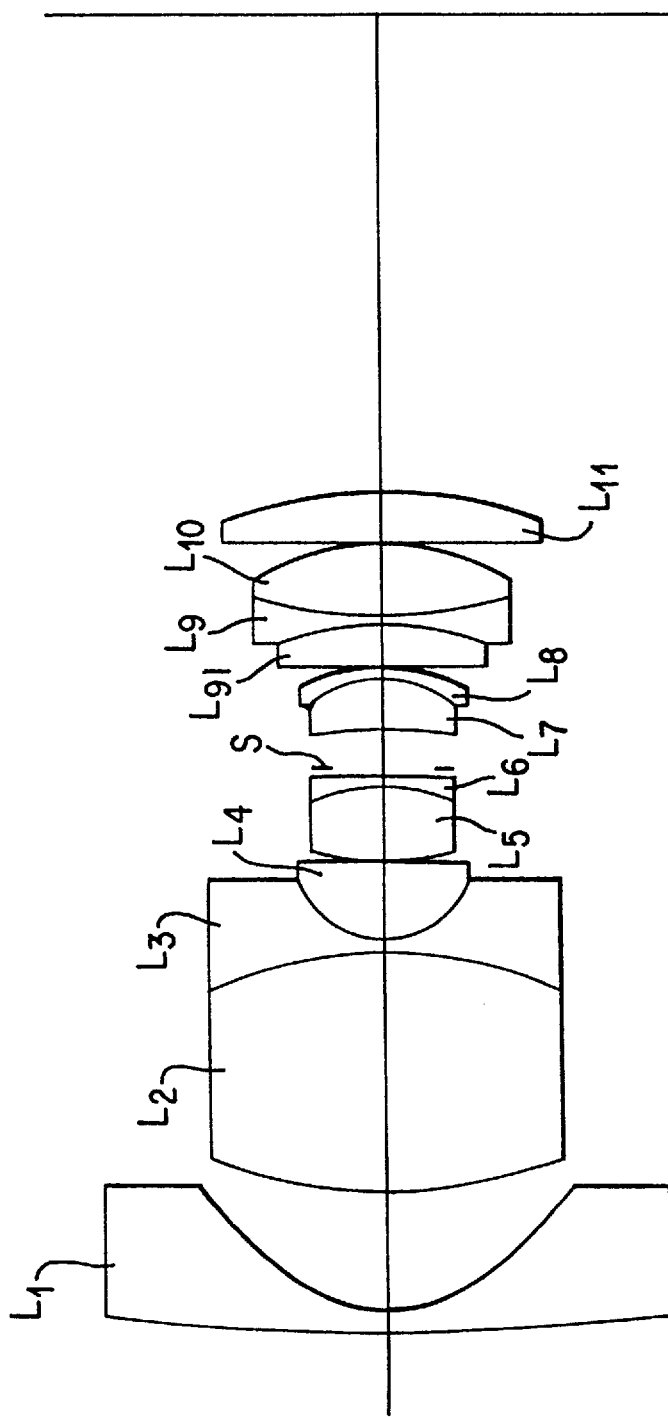
FIG. 4 is a schematic side view the structure of the lens of the third embodiment of the present invention.
Figure 5A:
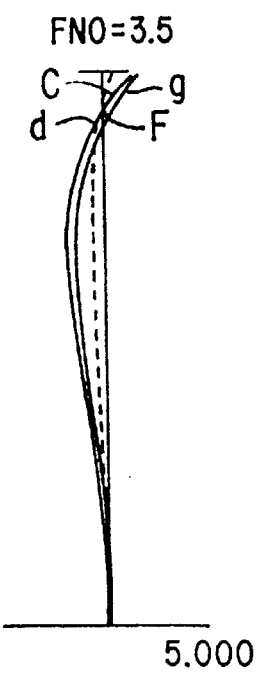
FIGS. 5A–5C and 5D–5F are graphs that show spherical aberration, astigmatism and distortion, respectively, at infinite shooting state and at about $\frac{1}{15}$ magnification shooting state in accordance with the third embodiment.
Figure 5B:
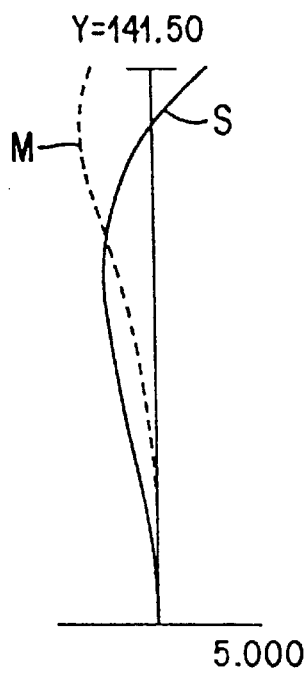
Figure 5C:
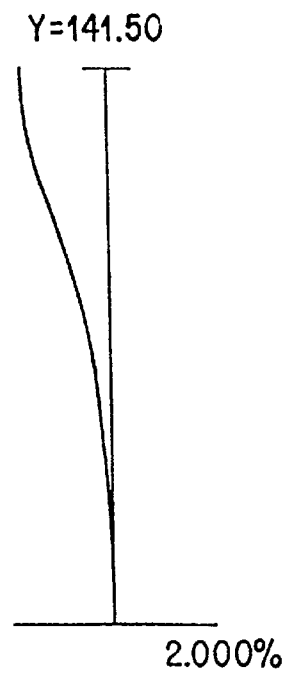
Figure 5D:
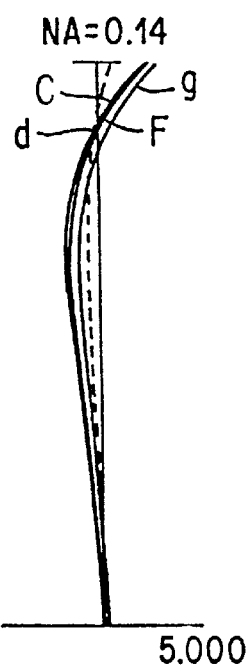
Figure 5E:
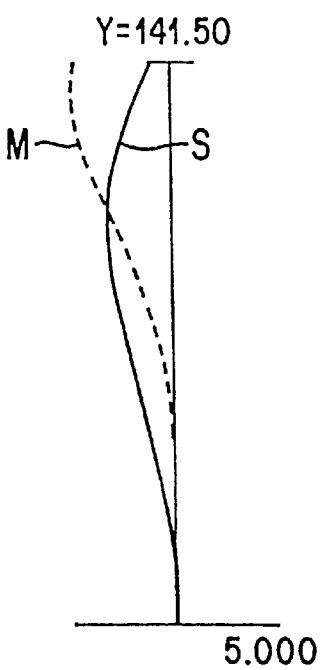
Figure 5F:
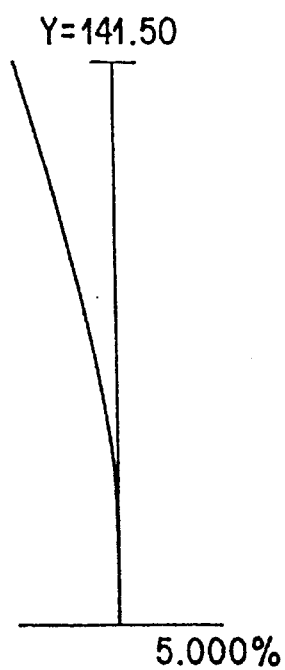

Embodiments of the wide angle photographic lens of the present invention will be described hereafter, with reference to the drawings. FIGS. 1 and 4 show the lens constructions of the first and third embodiments of the invention, respectively. The lens structure of the second embodiment is omitted since it is the same as that of the first embodiment, though variables of the second embodiment differ from the variables of the first embodiment, as shown in Tables 1 and 2, respectively. The first and the second embodiments comprise, in order from an object side: a first lens $L_1$ having a negative refractive power and being meniscus shaped with a concave surface facing the image side; a second lens $L_2$ having a positive refractive power and having a convex surface facing the object side; a third lens $L_3$ having a negative refractive power cemented to the second lens $L_2$ and having a surface with a larger absolute value of index of refraction on the image side; a fourth lens $L_4$ having a positive refractive power cemented to the third lens $L_3$ and having a surface with a larger index of refraction on the object side; a fifth lens $L_5$ having a biconvex shape; a sixth lens $L_6$ having a negative refractive power cemented to the fifth lens $L_5$; a seventh lens $L_7$ having a positive refractive power arranged on the image side of the sixth lens $L_6$ with the iris diaphragm S therebetween and having a surface with a larger refractive power on the image side; an eighth lens $L_8$ having a negative refractive power cemented to the seventh lens $L_7$ and having a surface with a larger absolute value of index of refraction on the object side; a ninth lens $L_9$ having a negative refractive power and having a concave surface on the image side; a tenth lens $L_{10}$ having a positive refractive power cemented to the ninth lens $L_9$; and an eleventh lens $L_{11}$ having a positive refractive power.

The third embodiment, though similarly formed, differs from the first and second embodiments by a lens $L_{91}$, arranged on the object side of the ninth lens $L_9$. The lens $L_{91}$ has a positive refractive power and is cemented to the ninth lens $L_9$.

In each embodiment, all the lenses arranged on the image side of the iris diaphragm S, that is, the seventh to the eleventh lenses $L_7$ to $L_{11}$ in the first and the second embodiments and the seventh to the eleventh lenses $L_7$ to $L_{11}$ and the lens $L_{91}$ in the third embodiment are structured to move freely along the optical axis of the lens system as one unit together with the iris diaphragm.

The overall variables and the lens variables of the first, second and third embodiments are listed in Tables 1, 2 and 3 below, respectively. In the tables, the first column contains the order of the lens surface from the object side, the second column contains a radius of curvature r of the lens surface, the third column contains the lens surface distance d, the fourth column contains the index of refraction n, the fifth column contains the value of the Abbe number ν relative to the d-line (λ=587.6 nm), and the sixth column contains the lens number. The lens surface $r_2$ marked with * on the lens surface number represents an aspherical surface having a conical constant κ equal to 0.05 for each embodiment. All the constants $c_4, c_6, \ldots$ in correction terms with the degree 4 and higher in the equation (a) are zero in each embodiment, hence the curvature of the aspherical surface $r_2$ decreases monotonically with distance from the optical axis.

The corresponding values of each embodiment in the conditional formulas (1)–(4) are listed in Table 4.

TABLE 1

Overall Variables

| Focal length: | 100 | F-number: | 3.5 |
|---|---|---|---|
| Back focus: | 247.1 | Half field angle: | 55° |

Lens Variables

| | r | d | n | $v_d$ | |
|---|---|---|---|---|---|
| 1 | 846.8 | 11.76 | 1.694 | 56.3 | $L_1$ |
| *2 | 63.55 | 58.81 | | | |
| 3 | 247.79 | 112.4 | 1.6727 | 32.2 | $L_2$ |
| 4 | −292.35 | 6.53 | 1.80411 | 46.5 | $L_3$ |
| 5 | 42.28 | 42.78 | 1.86994 | 39.8 | $L_4$ |
| 6 | 444.36 | 0.65 | | | |
| 7 | 113.81 | 29.41 | 1.51823 | 58.9 | $L_5$ |
| 8 | −55.19 | 10.46 | 1.76684 | 46.8 | $L_6$ |
| 9 | −185.64 | 5.88 | | | |
| 10 | ∞ | 20.58 | (iris diaphragm) | | |
| 11 | −218.92 | 25.48 | 1.56384 | 60.7 | $L_7$ |
| 12 | −48.40 | 11.77 | 1.86994 | 39.8 | $L_8$ |
| 13 | −91.07 | 0.65 | | | |
| 14 | −223.47 | 21.56 | 1.86994 | 39.8 | $L_9$ |
| 15 | 188.25 | 35.94 | 1.48749 | 70.4 | $L_{10}$ |
| 16 | −106.17 | 0.65 | | | |
| 17 | ∞ | 24.83 | 1.62041 | 60.1 | $L_{11}$ |
| 18 | −194.4 | | | | |

TABLE 2

Overall Variables

| Focal length: | 100 | F-number: | 3.5 |
|---|---|---|---|
| Back focus: | 246.9 | Half field angle: | 55° |

Lens Variables

| | r | d | n | $v_d$ | |
|---|---|---|---|---|---|
| 1 | 902.61 | 11.76 | 1.694 | 56.3 | $L_1$ |
| *2 | 62.22 | 60.14 | | | |
| 3 | 212.63 | 111.12 | 1.6727 | 32.2 | $L_2$ |
| 4 | −187.60 | 6.53 | 1.80218 | 44.7 | $L_3$ |
| 5 | 42.56 | 42.49 | 1.86994 | 39.8 | $L_4$ |
| 6 | 464.02 | 0.65 | | | |
| 7 | 117.60 | 29.41 | 1.51823 | 58.9 | $L_5$ |
| 8 | −56.03 | 11.11 | 1.76684 | 46.8 | $L_6$ |
| 9 | −189.13 | 5.23 | | | |
| 10 | ∞ | 20.92 | (iris diaphragm) | | |
| 11 | −273.21 | 25.82 | 1.56384 | 60.7 | $L_7$ |
| 12 | −46.45 | 12.42 | 1.80454 | 39.8 | $L_8$ |
| 13 | −93.09 | 0.65 | | | |
| 14 | −172.81 | 21.56 | 1.86994 | 39.8 | $L_9$ |
| 15 | 204.97 | 35.94 | 1.48749 | 70.4 | $L_{10}$ |
| 16 | −104.29 | 0.65 | | | |
| 17 | 5450.0 | 24.84 | 1.62041 | 60.1 | $L_{11}$ |
| 18 | −187.93 | | | | |

TABLE 3

Overall Variables

| Focal length: | 100 | F-number: | 3.5 |
|---|---|---|---|
| Back focus: | 245.9 | Half field angle: | 55° |

Lens Variables

| | r | d | n | $v_d$ | |
|---|---|---|---|---|---|
| 1 | 981.73 | 11.76 | 1.694 | 56.3 | $L_1$ |
| *2 | 61.66 | 60.13 | | | |
| 3 | 208.92 | 124.19 | 1.6727 | 32.2 | $L_2$ |
| 4 | −186.82 | 6.53 | 1.84042 | 43.3 | $L_3$ |
| 5 | 42.28 | 37.90 | 1.86994 | 39.8 | $L_4$ |
| 6 | 38376.0 | 0.65 | | | |
| 7 | 139.32 | 37.52 | 1.51680 | 64.1 | $L_5$ |
| 8 | −70.18 | 6.54 | 1.78791 | 47.5 | $L_6$ |
| 9 | −288.2 | 3.27 | | | |
| 10 | ∞ | 22.34 | (iris diaphragm) | | |
| 11 | −126.04 | 26.04 | 1.5168 | 64.7 | $L_7$ |
| 12 | −46.85 | 5.23 | 1.80411 | 46.5 | $L_8$ |
| 13 | −76.22 | 0.65 | | | |
| 14 | 4366.4 | 21.57 | 1.56384 | 60.7 | $L_{91}$ |
| 15 | −131.52 | 5.23 | 1.86994 | 39.8 | $L_9$ |
| 16 | 192.24 | 35.95 | 1.4645 | 65.8 | $L_{10}$ |
| 17 | −106.60 | 0.65 | | | |
| 18 | ∞ | 24.84 | 1.56384 | 60.7 | $L_{11}$ |
| 19 | −198.5 | | | | |

TABLE 4

| Embodiment Number | 1 | 2 | 3 |
|---|---|---|---|
| (1) κ | 0.05 | 0.05 | 0.05 |
| (2) $n_4 - n_3$ | 0.066 | 0.068 | 0.030 |
| (3) $r_5/f$ | 0.42 | 0.43 | 0.42 |
| (4) $n_i - n_r$ | 0.31 | 0.28 | 0.31 |

FIGS. 2A–2F, FIGS. 3A–3F and FIGS. 5A–5F are graphs that show spherical aberration, image plane astigmatism and distortion of the first, the second and the third embodiment respectively. FIGS. 2A–2C, 3A–3C and 5A–5C show the various aberrations during the infinite shooting distance state, and FIGS. 2D–2F, 3D–3F and 5D–5F show the various aberrations during shooting magnification of about 1/15. FIGS. 2D–2F, 3D–3F and 5D–5F represent a condition in which the lenses $L_7$–$L_{11}$, and $L_{91}$ after the iris diaphragm are moved forward about 6.5 to focus. In each figure, FNO denotes the F-number and Y denotes the image height. Further, in each spherical aberration graph, the dotted line represents the sine condition. In each image plane astigmatism graph, the broken line represents the meridional image plane (M) and the real line represents the sagittal image plane (S).

Each aberration graph clearly indicates that various aberrations are corrected favorably in each embodiment. Also, in each embodiment the diameter of the first lens $L_1$ is approximately 270. In other words, the invention achieves a small, light weight wide angle photographic lens having the lens structure described above, and by structuring the lens system to satisfy conditional formulas (1), (2), (3) and possibly (4), the field angle is 110°, the back focus is more than 2.4 times the focal length, and various aberrations are favorably corrected.

Additionally, because an aspherical surface is used as the second surface of the first lens $L_1$, aberrations, particularly negative distortion and coma, are reduced in comparison to the case in which the surface is spherical. Hence, the burden applied to the second lens $L_2$ is reduced, and turbulence of various aberrations is small even if focusing of the close distance shooting state is executed by moving forward the iris diaphragm S and the lenses $L_7$–$L_{11}$ and $L_{91}$ which are beyond the iris diaphragm S.

As described above, in the first embodiment the ninth lens $L_9$ and the tenth lens $L_{10}$ are cemented, but a wide angle photographic lens with favorable correction of various aberrations is obtained even when $L_9$ and $L_{10}$ are not cemented.

Further, the wide angle photographic lens disclosed in the specification of the application need not be limited to use in a camera, but may be used in a television lens, a video camera lens, a movie camera lens and the like.

As described above, the lens system of the invention may be used in a single-lens reflex camera with a large back focus of more than 2.4 times the focal length with a field angle of approximately 100°, and a small, light weight wide angle photographic lens is obtained with an attachment size of less than approximately 3.5 times the focal length and in which various aberrations are favorably corrected.

I claim:

1. A lens system comprising, in order from an object side to an image side:
   a first lens having a negative refractive power and having a meniscus shape with a concave surface facing the image side;
   a second lens having a positive refractive power and having a convex surface facing the object side;
   a third lens having a negative refractive power cemented to the second lens, and having an image side surface with a larger absolute value of refractive power than an object side surface of the third lens;
   a fourth lens having a positive refractive power cemented to the third lens and having an object side surface with a larger refractive power than an image side surface of the fourth lens; and
   a plurality of lenses and an iris diaphragm on the image side of the fourth lens,
   wherein a shape of the image side concave surface of the first lens satisfies the following conditional formula, in which x is a distance in a direction of an optical axis of the lens system, y is a height from the optical axis, c is a curvature of a concave surface at a vertex, $\kappa$ is a conical constant and $c_4$, $c_6$ ..., are constants:

$$x = cy^2/\{1+(1-\kappa c^2 y^2)^{1/2}\} + c_4 y^4 + c_6 y^6 +$$

where $$-0.3 < \kappa < 0.3$$

and the curvature of the concave surface decreases monotonically with increasing distance from the optical axis, and wherein the lens system satisfies the following conditional formulae:

$$0 < n_4 - n_3 < 0.15$$

$$0.2 < r_5/f < 0.7$$

where $n_3$ and $n_4$ are an index of refraction of the third lens and an index of refraction of the fourth lens, respectively, $r_5$ is a radius of curvature of a common boundary surface of the third lens and the fourth lens, and f is a focal length of the total lens system.

2. The lens system of claim 1, wherein the lens system further satisfies the following conditional formula:

$$0.15 < n_l - n_r$$

where $n_l$ is an average value of an index of refraction of all negative lenses positioned on the image side of the iris diaphragm, and $n_r$ is an average value of an index of refraction of all positive lenses positioned on the image side of the iris diaphragm out of the plurality of the lenses positioned on the image side of the fourth lens.

3. The lens system of claim 1, wherein all lenses arranged closer to the image side than the iris diaphragm from among the plurality of lenses positioned closer to the image side than the fourth lens are arranged to move freely along the optical axis as one unit.

4. The lens system of claim 1, wherein the plurality of lenses arranged closer to the image side than the fourth lens comprises, in order from the object side to the image side:
   a fifth lens having a biconvex shape;
   a sixth lens having a negative refractive power cemented to the fifth lens;
   a seventh lens having a positive refractive power and having an image side surface with a larger refractive power than an object side surface of the seventh lens, the iris diaphragm being located between the sixth lens and the seventh lens;
   an eighth lens having a negative refractive power cemented to the seventh lens and having an object side surface with a larger absolute value of index of refraction than an image side surface of the eighth lens;
   a ninth lens having a negative refractive power and having a concave surface on the image side;
   a tenth lens having a positive refractive power cemented to the ninth lens; and
   an eleventh lens having a positive refractive power.

5. The lens system of claim 4, wherein the ninth lens and the tenth lens are cemented.

6. The lens system of claim 4, wherein an additional lens having a positive refractive power is cemented to the ninth lens on the object side of the ninth lens.

7. The lens system of claim 2, wherein all lenses arranged closer to the image side than the iris diaphragm from among the plurality of lenses positioned closer to the image side than the fourth lens are arranged to move freely along the optical axis as one unit.

8. The lens system of claim 7, wherein the plurality of lenses arranged closer to the image side than the fourth lens comprises, in order from the object side to the image side:

a fifth lens having a biconvex shape;

a sixth lens having a negative refractive power cemented to the fifth lens;

a seventh lens having a positive refractive power and having an image side surface with a larger refractive power than an object side surface of the seventh lens, the iris diaphragm being located between the sixth lens and the seventh lens;

an eighth lens having a negative refractive power cemented to the seventh lens and having an object side surface with a larger absolute value of index of refraction than an image side surface of the eighth lens;

a ninth lens having a negative refractive power and having a concave surface on the image side;

a tenth lens having a positive refractive power cemented to the ninth lens; and an eleventh lens having a positive refractive power.

9. The lens system of claim 1, wherein the lens system is a wide-angle lens having a field angle of 100° and an attachment size of approximately 3.5 times the focal distance of the lens system or less.

* * * * *